UNITED STATES PATENT OFFICE.

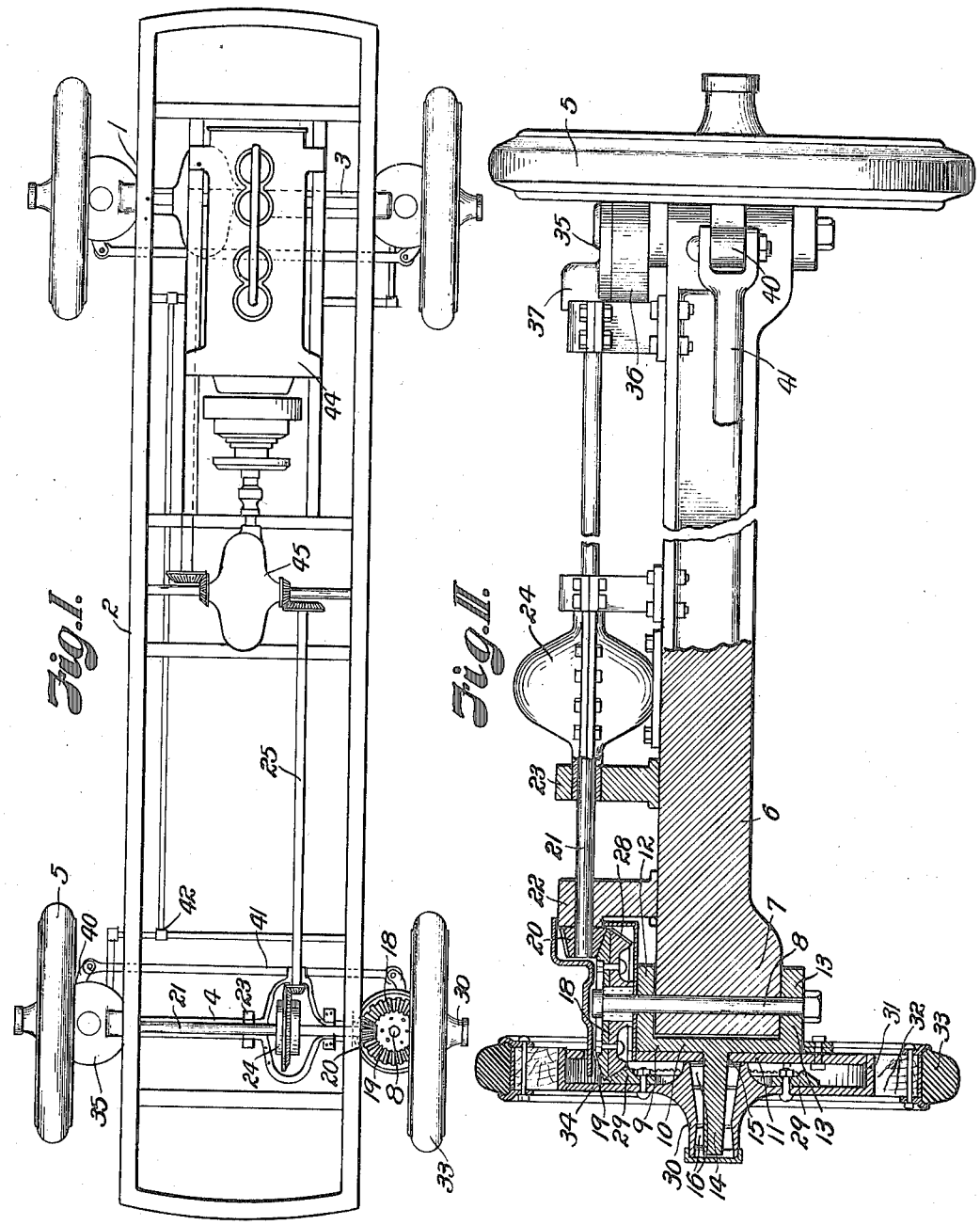

THEODORE DITMARS, OF KANSAS CITY, MISSOURI.

DRIVING MECHANISM.

1,255,299. Specification of Letters Patent. Patented Feb. 5, 1918.

Application filed January 20, 1915. Serial No. 3,278.

*To all whom it may concern:*

Be it known that I, THEODORE DITMARS, a citizen of the United States, residing at Kansas City, in the county of Jackson and State of Missouri, have invented certain new and useful Improvements in Driving Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to driving mechanism for automobiles, and has for its principal object to provide means whereby power from a prime mover may be applied to each wheel of the vehicle individually without interfering with the steering mechanism.

In accomplishing this object I have provided the details of structure hereinafter described and illustrated by the accompanying drawings, wherein:—

Figure I is a plan view of the chassis of an automobile provided with my improved driving mechanism.

Fig. II is an elevation of an axle and wheels, parts being in vertical section.

Referring more in detail to the drawings:—

1 designates the chassis, 2 the frame, 3—4 the front and rear axles respectively, and 5 the wheels of an automobile of ordinary construction.

Each axle comprises a horizontal bar 6, preferably of the I-beam type, provided with end knuckles 7 for receiving vertical pins 8.

Pivotally mounted on the pins 8 are steering yokes 9; each yoke comprising a body portion 10, which is rigidly bolted to a vertical disk 11, and having integrally formed upper and lower yoke arms 12—13 for receiving the axle knuckles 7 and vertical pins 8.

Integrally formed with the yokes 9 are spindles 14 which project outwardly through central openings 15 in the disks 11 and are provided with anti-friction bearings 16 for supporting the wheels 5 of the vehicle.

Revolubly mounted on the pins 8 and supported on the upper yoke arms 12 are gear wheels 18, each wheel being provided with an upper beveled gear face 19 adapted for meshing with bevel pinions 20 mounted on drive shafts 21 that are revolubly carried in standards 22—23 and driven through the differential gearing 24 from the main drive shaft 25.

Each gear wheel 18 is also provided with an under-beveled gear face 28 adapted for meshing with a bevel toothed ring 29 that is rigidly bolted to the wheel body concentric with the wheel circumference, and by which means the wheel is driven when the gear 18 is revolved by the drive shaft 21.

Each of the wheels 5 preferably comprises a body portion having an integrally cast hub 30 and an inwardly turned peripheral flange 31 adapted for receiving the disk 11 and within which the latter is closely and revolubly fitted.

Mounted on the flange 31 in any suitable way is a wood filler 32 on which is carried a tire 33 of any suitable kind.

In order that the gear 18 may contact the gear band 29 I provide a slot 34 in the disk 11 through which the said gear may project to contact the said gear band.

The gearing is preferably inclosed in a casing 35, comprising a lower portion 36 that is seated on the yoke arm 12 and secured thereto in any suitable manner, and a covering 37 which is also projected through the slot 29 in the disk 11 to entirely cover the gear 18 in order that no gearing parts are exposed when the car is turned from one direction to the other.

Integrally formed with the yokes 9 are steering arms 40 that are connected in the usual manner by cross rods 41 by which the wheels are held in proper alinement and guided by steering mechanism 42, of any suitable kind, whereby all four wheels are utilized in steering the car.

Presuming the parts to be constructed as described it will be seen that power from a motor 44 may be transmitted through a central differential gearing 45 to the drive shafts 25 to the differential gearing 24 to drive shafts 21 to each wheel individually and in no way interfering with the steering of each wheel.

Having thus described my invention, what I claim as new therein and desire to secure by Letters-Patent, is:—

1. The combination with an axle, of a knuckle, a vertical knuckle pin mounting the knuckle on said axle and projecting above the latter, a spindle on said knuckle, a wheel on said spindle comprising a cupped body portion, a rack fixed to the cupped body portion, a plate fixed to the knuckle and closing the cupped body portion to form a rack chamber; the said plate having a slot therein, a beveled gear wheel rotatable on the knuckle pin and projected through the plate slot to engagement with the rack, and a drive shaft having a gear wheel meshing with the beveled gear wheel.

2. The combination with an axle, of a knuckle having a spindle, a vertical pin mounting the knuckle on the axle, a wheel comprising rim members and a cupped body comprising a hub and laterally turned edge flange, a plate fixed to the knuckle and lying within the edge of the flange to form a rack chamber, and having a slot above the axle, a rack fixed to the body member within said chamber, a beveled gear wheel rotatable on the knuckle pin and projected through the plate slot to engagement with said rack, and a drive shaft having a pinion meshing with the beveled gear wheel.

3. The combination with an axle, of a knuckle having a spindle, a vertical pin mounting the knuckle on the axle, a wheel comprising rim members and a cupped body comprising a hub and laterally turned edge flange, a plate fixed to the knuckle and lying within the edge of the flange to form a rack chamber, and having a slot above the axle, a rack fixed to the body member within said chamber, a beveled gear wheel rotatable on the knuckle pin and projected through the plate slot to engagement with said rack, a drive shaft having a pinion meshing with the beveled gear wheel, and a housing for the beveled gear wheel and pinion and extending through the slot into the rack chamber.

4. In an automobile, an axle having a knuckle at each end, a vertical pin mounted in each knuckle, a steering yoke pivotally mounted on each pin and having a laterally projecting spindle integrally formed therewith, a wheel revolubly mounted on each spindle comprising an integrally formed hub and body portion; said body having an integral, inturned, peripheral flange forming a circular drum, a circular disk rigidly mounted on each of said steering yokes having central apertures for receiving said spindles and having a horizontal slot near its upper edge, the latter being revoluble thereon, a beveled rack secured within said drum and concentric therewith, a double gear wheel revolubly mounted on said vertical pin and having a gear face adapted for meshing with said rack, a drive shaft mounted on said axle, a bevel pinion mounted on said drive shaft and adapted for meshing with a face of said double gear wheel, and means for driving said drive shaft.

In testimony whereof I affix my signature in presence of two witnesses.

THEODORE DITMARS.

Witnesses:
    LYNN A. ROBINSON,
    LETA E. COATS.